Oct. 15, 1935.  C. SAUZEDDE  2,017,076
WHEEL STRUCTURE
Filed Oct. 20, 1932  2 Sheets-Sheet 1

INVENTOR
Claude Sauzedde
BY

ATTORNEYS

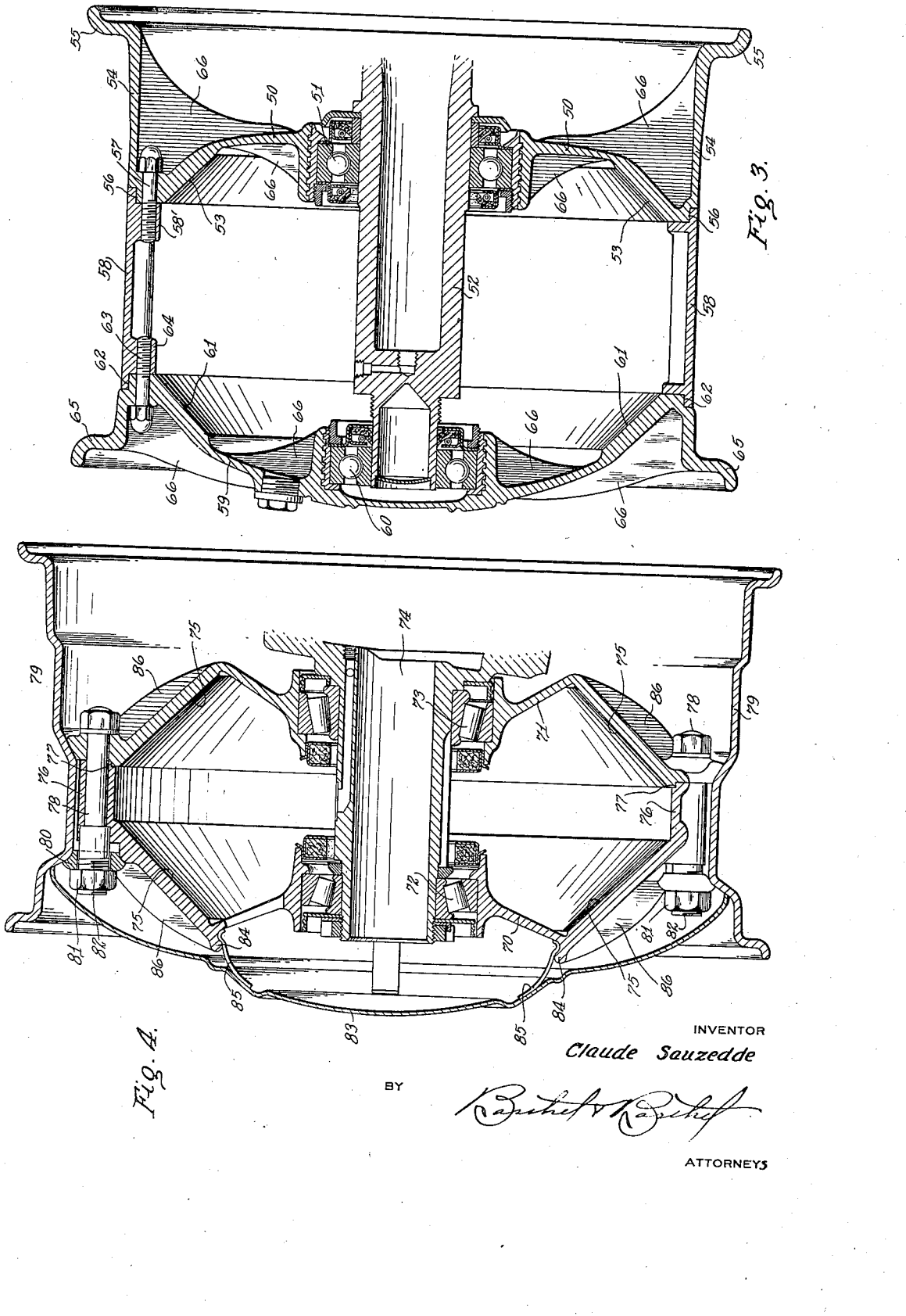

Patented Oct. 15, 1935

2,017,076

UNITED STATES PATENT OFFICE 2,017,076

WHEEL STRUCTURE

Claude Sauzedde, Detroit, Mich., assignor to Detroit Hydrostatic Brake Corporation, Detroit, Mich., a corporation of Michigan Application October 20, 1932, Serial No. 638,805

8 Claims. (Cl. 301—6)

The present invention relates to wheels, and particularly to wheels adapted to support low pressure pneumatic tires and to enclose a braking mechanism therein and suitable for use on passenger or commercial vehicles and aircraft.

The present wheel is provided as a solution to the problem presented by the introduction of the low pressure type of pneumatic tires for use on automotive vehicles and aircraft. In the type of tire designed to operate with an air pressure as low as approximately ten pounds it is necessary to provide a cross sectional area that is increased considerably as compared with conventional balloon tires which operate at a low pressure of approximately thirty-five pounds. In order to increase the cross sectional area of the tire without increasing its outside diameter to such an extent as to prohibit its use on standard automobiles it becomes necessary to make the inside diameter smaller. Decreasing the inside diameter the required amount resulted in a tire having an internal diameter which is smaller than the wheels used as standard in the automotive industry and it therefore becomes necessary to provide a wheel having an outside diameter no greater than the diameter of the conventional hub on standard wheels. The outside diameter of the wheel must necessarily be smaller than the outside diameter of the prevailing open type brake drums which in order to provide for successful operation of the low pressure tires must be eliminated. In the present practice it is impossible to mount low pressure tires on all standard automobiles because of the limitations defined by the size of the hub necessary and because of the diameter of the brake drum.

It is the primary object of the present invention to provide a wheel which is so designed to have an outside diameter permitting the mounting of a low pressure type of tire thereon, designed so that the side walls serve as brake drums, and having a closed, dust proof chamber therein suitable for receiving a braking mechanism.

With the above and other ends in view the invention consists in matters hereinafter set forth and more particularly pointed out in the appended claims, reference being had to the accompanying drawings, in which—

Fig. 3 is a vertical cross section illustrating the side members shaped to retain a tire on the present wheel, and Fig. 4 illustrates a wheel embodying a removable rim.

Like characters of reference are employed throughout to designate corresponding parts.

Figure 1:
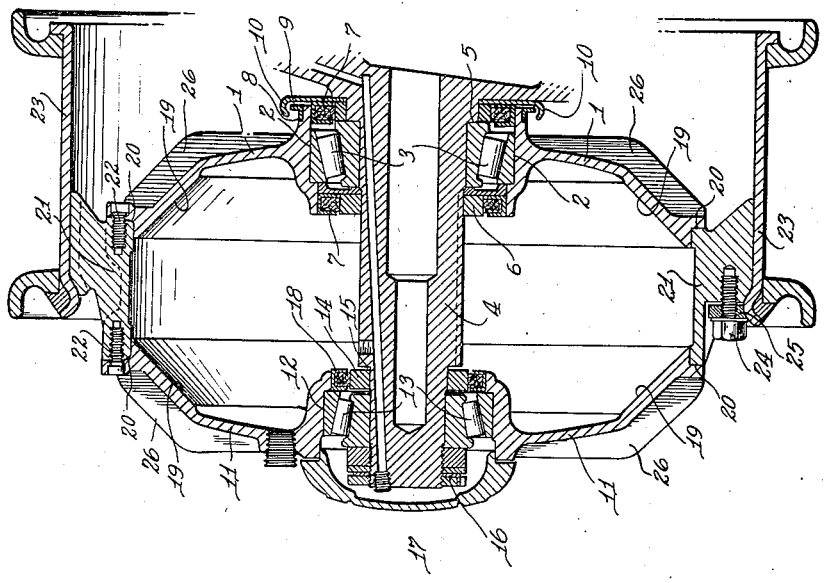
Figure 1 is a vertical cross section of a wheel hub having a tire supporting rim thereon.

Referring to Figure 1 of the drawings, the numeral 1 indicates the rear side member of the wheel having an axial opening 2 therein which receives the bearing 3 that is mounted on an axle spindle 4 and located by a shoulder 5 and ring 6. Within the central opening 2 are mounted sealing rings 7 and surrounding the opening on the outer face of the side member 1 is mounted a ring 8 having an outwardly extending flange 9 which projects into a groove in a dust plate 10 that is mounted on the axle spindle 4 externally of the wheel. The sealing rings 7 and the flanged ring 9 which cooperates with the dust plate 10 effectively prevent foreign matter such as dust, grit, rain etc. from passing through the axial opening in the side member 1.

The front side member 11 has an axial opening 12 which receives the bearings 13 which are held on the spindle 4 by a ring 14 which abuts a shoulder 15 on the spindle and lock nuts 16 which are received on the outer screwthreaded end of the spindle. A cap member 17 has a portion received in the central opening 12 and serves as a means for covering the same and for preventing dust, grit, rain, etc., from passing into the opening, the other end of which is sealed by a sealing ring 18 which is received in the opening 12 to engage the ring 14.

In the above manner the two side members are mounted in spaced relation on the axle spindle at the points where they engage the bearings on the spindle and the side walls are constructed to extend outwardly in substantially radial fashion relative to the axle spindle for a distance and then the side members are specially formed to provide brake drum portions 19. The brake drum portions are formed by converging the side wall members toward each other whereby the two side walls combine to form a substantially conical chamber.

The outer edges of the side wall members are recessed as at 20 to receive a piloting ring or felloe 21 secured to the side walls by screws 22 in a manner to secure said side walls together in the required spaced relation. Received on the felloe 21 is a demountable tire receiving rim 23 which is secured thereon by bolts 24 and specially shaped washers 25.

Heat dissipating fins or ribs 26 are formed on the outside face of both side members to extend in a radial manner to dissipate heat generated by contact of brake shoes with the brake drum portions 19 so that the heat is not conducted through the felloe 21 to the tire.

Figure 2:
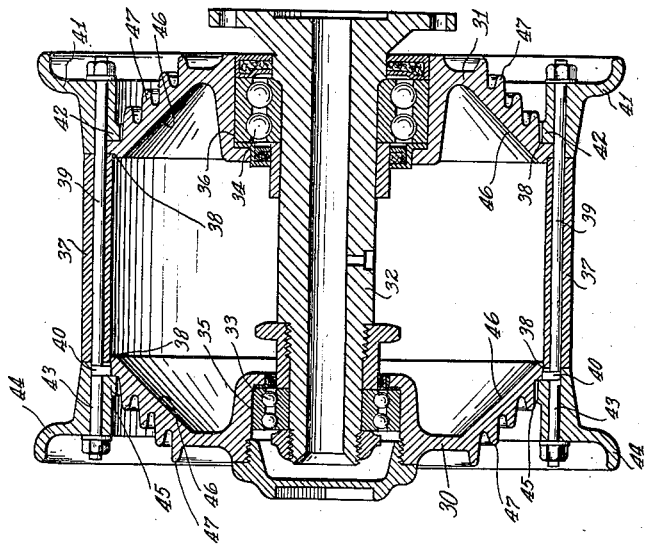
Fig. 2 is a vertical cross section of a similar wheel hub illustrating the manner in which rings may be secured thereto so that a tire may be mounted directly thereon.

In Figure 2 there is illustrated a wheel construction wherein side wall members 30 and 31 are supported on an axle spindle 32 by bearings 33 and 34 which are received in axial openings 35 and 36 of the side members 30 and 31 respectively. A ring or felloe 37 is received in recesses 38 in the side members and is secured thereto in a manner to attach the two side wall members in proper spaced relation. The means for securing the side wall members to the felloe 37 comprises bolts 39 having heads 40 at one side of the felloe and extending through the felloe and through a ring 41 which has a flange 42 that engages the side wall member 31 to tightly clamp it against the felloe. At the opposite end the bolt 39 has a projecting portion 43 which extends outwardly beyond the head 40 to provide means for securing a ring 44 with its flange 45 engaging the outer face of the side wall member 30 to permit the latter to be tightly clamped against the felloe.

As in the above described embodiment the side wall members 30 and 31 converge inwardly towards each other as at 46 to co-act with the felloe 37 to provide a chamber suitable for receiving and enclosing a braking mechanism of a type having wedge shaped brake shoes that engage the converged portions 46 which serve as brake drums. To dissipate heat generated within the chamber formed as above described the side wall members 30 and 31 are provided with a plurality of ring-like fins 47 which increase the outer surface of said side members to such an extent that the heat may be dissipated effectively without reaching the tire.

In this embodiment the felloe 37 receives a tire directly while the rings 41 and 44 retain the tire on the felloe. In order to mount or dismount the tire the two part bolt, 37 and 43 is provided and serves in a manner permitting the removal of the ring 44 without disturbing the remainder of the construction.

In Figure 3 there is illustrated a wheel comprising a rear side wall member 50 which is mounted on bearings 51 on the axle spindle 52. The side wall member extends outwardly in a substantially radial manner and inclines inwardly as at 53 to provide a brake drum portion. At its outer edge the side wall extends outwardly in a cylindrical manner as at 54, the outer edge of the cylindrical portion being flanged outwardly as at 55 in a manner to provide tire retaining ring which is integral with the side wall member 50. The side wall member 50 is provided with a recess 56 into which projects a portion of a rim or felloe 58 which is secured thereto by bolts 57 that pass through the side wall member 50 and into lugs 58' on the rim or felloe.

The front side wall member 59 is mounted on bearings 60 on the axle spindle 52 and has an inwardly inclined portion 61 which co-acts with the portion 53 of the side wall member 50 in forming a brake drum and chamber suitable for the reception of wedge type brake shoes and actuating means therefor. The outer portion of the front side wall member 59 is recessed as at 62 to receive the rim or felloe 58 to which it is secured by bolts 63 that pass through the front side wall member into the lugs 64 on the rim or felloe. The extreme outer portion of the front side wall member 59 is shaped as at 65 to provide an integral tire retaining ring which coacts with the tire retaining ring 55 in retaining a tire on the felloe or rim 57 and cylindrical portion 54 of the rear side wall member 50. Internal and external radial type heat dissipating fins 66 are formed on the side wall members.

In the embodiment illustrated in Figure 4 the front wall member 70 and the rear wall member 71 are mounted on bearings 72 and 73 respectively on the axle spindle 74. The side walls converge inwardly in a direction towards each other to provide brake drum portions 75. The front side wall 70 is formed with a cylindrical portion 76 which serves as a felloe integral with the side wall. The side wall 71 is recessed as at 77 to receive the felloe 76 and bolts 78 secure the felloe to the rear wall member and thus tie the front and rear wall members together.

A tire rim 79 is mounted on the felloe 76 and is held in place by lugs 80 that are drawn into contact therewith by means of nuts 81 that are received on the projecting ends 82 of the bolts 78.

In order to secure a hub cap 83 in place the front wall member is provided with an outwardly projecting ring-like portion 84 which receives the spring clips 85 on the hub cap.

As in the other modification provision is made for dissipating heat generated within the chamber formed by the specially shaped wall members. For this purpose radially extending fins 86 are formed on both the front and rear side wall members.

The several structures disclosed herein are also disclosed as housings for the brake mechanisms utilized therewith in the following companion applications, in which the claims pertain more particularly to the brake mechanism structure: The form shown in Fig. 1 is disclosed in application filed January 4, 1932, Serial No. 584,666; the form of Fig. 2 is disclosed in application filed March 31, 1930, Serial No. 440,276; the form shown in Fig. 3 is disclosed in application filed August 20, 1931, Serial No. 558,299, and the form shown in Fig. 4 is disclosed in application filed July 18, 1931, Serial No. 623,120.

Since the brake mechanisms are enclosed within the housings, and the latter present the hub zone portions of the complete wheel structure in service, with the housings carrying the rotating portion of the braking assembly, it is apparent that the housings are capable of use as such hub zone whether or not the brake mechanism be installed therein, thus making it possible to provide uniformity in appearance of the wheels of the motor vehicle, regardless of whether or not the brake mechanism is applied to all or to but a portion of the wheels of the vehicle. Hence, the respective housings may become standard for all of the wheels of the car and be manufactured along definite lines.

Although specific embodiments of the present invention have been illustrated and described it is to be understood that various changes may be made in the details of construction without departing from the spirit of the invention, and such changes are contemplated.

What I claim is:—

1. In wheel structures for service with motor vehicles or the like, wherein the wheel tire is of relatively low pressure characteristic, and wherein the tire seat support is in the form of a hollow structure adapted to receive brake mechanism therein, said hollow structure comprising a pair of side members axially alined, each member having an axial zone arranged to be supported on an axle by anti-friction bearings and for the positioning of dust-excluding means within the bearing zone, each member including an annular zone extending internally as a plane surface inclined both to the member axis and a plane normal thereto on a radial section of the member with the plane surface adapted to serve as a braking surface, the inclination of such zone of one member being approximately opposite that of the companion member, the hollow structure being completed by an annular spacing structure positioned to space said inclined zones and having an internal diameter approximately equal to the greatest diameter of such inclined zones, means in the zone of the spacing structure operative to removably secure the opposed members in predetermined relation with the inclined zones and spacing structure completing the peripheral zone of the hollow structure, the outer periphery of the spacing structure extending substantially to the tire-seat zone of the wheel.

2. A wheel structure as in claim 1 characterized in that the spacing structure is in the form of a lateral flange carried by the outer member and having a pilot relation with the inner member.

3. A wheel structure as in claim 1 characterized in that the spacing structure is in the form of an annular element interposed between and having a pilot relation with both members.

4. A wheel structure as in claim 1 characterized in that each member carries a peripheral formation forming a flange of the tire seat.

5. A wheel structure as in claim 1 characterized in that at least one of the members has a peripheral formation adapted to form a seat for the tire seat.

6. A wheel structure as in claim 1 characterized in that the spacing structure is in the form of an annular member between and having a piloting relation to both side members, said annular member having a seat for the tire seat.

7. A wheel structure as in claim 1 characterized in that the spacing structure is in the form of an annular member between and having a pilot relation with both side members, the outer periphery of the annular member forming a portion of the tire seat.

8. A wheel structure as in claim 1 characterized in that the tire seat is positioned asymmetrical with respect to the hollow structure to provide the major portion of the seat as overlying the inner member with the tire seat projecting inwardly beyond the inner member.

CLAUDE SAUZEDDE.